United States Patent [19]

Clemens

[11] 4,296,485
[45] Oct. 20, 1981

[54] TILT ALARM IN A SEISMIC EXPLORATION SYSTEM

[75] Inventor: Lawrence G. Clemens, Bartlesville, Okla.

[73] Assignee: Phillips Petroleum Company, Bartlesville, Okla.

[21] Appl. No.: 955,904

[22] Filed: Oct. 30, 1978

[51] Int. Cl.$^3$ ............................................. G01V 1/22
[52] U.S. Cl. ...................................... 367/77; 340/689
[58] Field of Search ........................... 367/76, 77, 14; 340/565, 566, 568, 571, 689

[56] References Cited

U.S. PATENT DOCUMENTS

| | | | |
|---|---|---|---|
| 3,359,550 | 12/1967 | Christensen | 340/689 |
| 3,710,371 | 1/1973 | Whelan et al. | |
| 3,725,890 | 4/1973 | Cirino | |
| 3,740,648 | 6/1973 | Grotjohn | |
| 3,786,469 | 1/1974 | Massaro et al. | |
| 3,818,467 | 6/1974 | Willis | |
| 3,831,163 | 8/1974 | Byers | 340/689 |
| 3,879,703 | 4/1975 | Bonazoli et al. | 340/689 |
| 3,952,283 | 4/1976 | Broding | 367/76 |
| 4,030,087 | 6/1977 | Ritchie et al. | 340/571 |
| 4,057,791 | 11/1977 | Bimmerle et al. | 340/571 |
| 4,086,504 | 4/1978 | Ezell et al. | 367/77 |
| 4,167,733 | 9/1979 | Krause et al. | 340/689 |

Primary Examiner—Howard A. Birmiel

[57] ABSTRACT

In a seismic exploration in which a plurality of remote geophone monitors are utilized to acquire data from a plurality of geophones and transmit the data to a central control station, method and apparatus is provided whereby an indication that the remote geophone monitor has been tilted is transmitted from the remote geophone monitor to the central control station. Method and apparatus can also be provided whereby an audio alarm is sounded at the location of the remote geophone monitor if the remote geophone monitor is tilted.

8 Claims, 4 Drawing Figures

TILT ALARM IN A SEISMIC EXPLORATION SYSTEM

This invention relates to method and apparatus for providing an indication to a central control station that a remote geophone monitor, which is used to acquire data from a plurality of geophones and transmit the data to the central control station, has been tilted. This invention further relates to method and apparatus for setting off an audio alarm at the location of a remote geophone monitor when the remote geophone monitor is tilted.

The seismic method of mapping geological subsurfaces of the earth involves the use of a source of seismic energy and its reception by an array of seismic detectors, generally referred to as geophones. When used on land, the source of seismic energy generally is a high explosive charge electrically detonated in a borehole connected at a selected grid point in a terrain or is an energy source capable of delivering a series of impacts to the earth's surface such as that used in Vibroseis. The acoustic waves generated in the earth by the explosion or impacts are reflected back from pronounced strata boundaries and reach the surface of the earth after varying intervals of time, depending on the distance and the nature of the subsurface traversed. These returning acoustic waves are detected by the geophones, which function to transduce such acoustic waves into representative electrical signals. The plurality of geophones are arrayed in a selected manner to detect most effectively the returning acoustic waves and generate electrical signals representative thereof from which data may be deduced concerning the geological subsurface of the earth.

It is common today in seismic exploration to utilize 48 geophone stations simultaneously for every shot point location. The geophone stations are commonly laid out in a line which is referred to as a "seismic exploration spread". A 48-channel spread will usually extend from 7 to 9 miles. In many seismic systems utilized today in seismic exploration, a plurality of remote geophone monitoring means are utilized to acquire and process seismic data supplied from the geophone stations. This seismic data is then transmitted from the remote geophone monitoring means to a central control station to thereby enable the seismic data obtained from a particular shot to be compiled at a central location.

Ordinarily, an operator does not remain with each of the remote geophone monitoring means after deployment thereof. It is possible that animals, wind or other outside forces may cause the remote geophone monitoring means to be tilted. It is also possible that a hunter or other person may think the remote geophone monitoring means has been abandoned and simply try to pick up the remote geophone monitoring means and carry it away. It is important that an operator at the central control station be informed when any of these conditions occur to thereby prevent the loss of a remote geophone monitoring means or prevent the loss of data from a remote geophone monitoring means because the remote geophone monitoring means has been tilted. This is especially true where a radio communication system couples the remote geophone monitoring means to the central control station. If the remote geophone monitoring means is tilted, then the communication's antenna associated with the remote geophone monitoring means may not be properly aligned to allow transmission of seismic data from the remote geophone monitoring means to the central control station. It is thus an object of this invention to provide method and apparatus for providing an indication to a central control station that a remote geophone monitor, which is used to acquire data from a plurality of geophones and transmit the data to a central control station, has been tilted.

It is also desirable that some type of alarm be sounded if the remote geophone monitoring means is tilted by an animal or if a hunter or other person tries to pick up the remote geophone monitoring means and carry it away. The audio alarm would tend to scare away any animals before the remote geophone monitoring means is tilted to the point as to not be operable and an audio alarm would indicate to a human who picks up the remote geophone monitoring means that the remote geophone monitoring means has not been abandoned. It is therefore a further object of this invention to provide method and apparatus for setting off an audio alarm at the location of a remote geophone monitoring means when the remote geophone monitoring means is tilted.

In accordance with the present invention, method and apparatus is provided whereby a switch is utilized to provide a tilt alarm from the remote geophone monitoring means to the central control station. As long as the remote geophone monitoring means remains in a substantially upright position, the switch remains closed and the alarm system is inhibited. If the remote geophone monitoring means should be tilted in any direction, the switch will open and enable the tilt alarm circuitry. The tilt alarm circuitry generates an output alarm signal which is provided to a transmitter associated with the remote geophone monitoring means when the tilt alarm circuitry is enabled. The tilt alarm signal is transmitted from the remote geophone monitoring means to the central control station to thereby provide an indication to an operator, located at the central control station, that a particular one of the plurality of remote geophone monitoring means being used in a seismic exploration system has been tilted.

An audio alarm system is also provided at the remote geophone monitoring means. As long as the tilt alarm switch remains closed, the audio alarm system will be inhibited. When the tilt alarm switch is open indicating that the remote geophone monitoring means has been tilted, electronic circuitry is enabled which supplies a drive signal to the audio alarm. The audio alarm associated with the remote geophone monitoring means is activated in response to the drive signal and is utilized to scare away any animals or to indicate to a human who picks up the remote geophone monitoring means that the remote geophone monitoring means has not been abandoned.

Other objects and advantages of the invention will be apparent from the description of the invention and the appended claims as well as from the detailed description of the drawings in which:

FIGS. 5–73 of application Ser. No. 955,905, filed Oct. 30, 1978, by Robert H. Lacy, now U.S. Pat. No.

Figure 1:
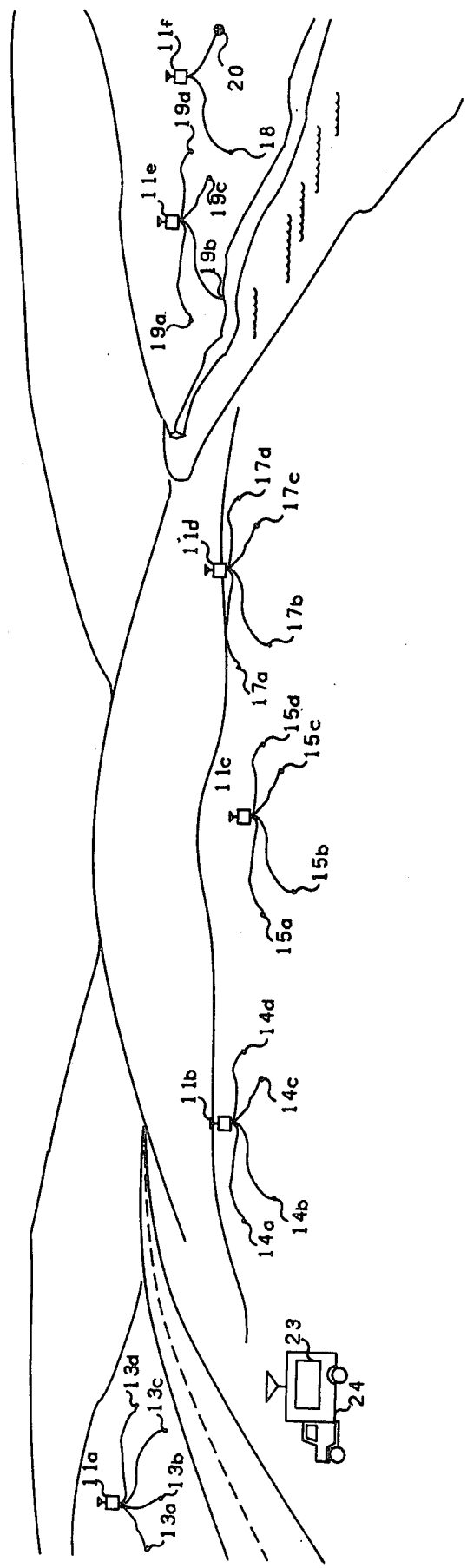
FIG. 1 is an illustration of a possible physical arrangement of the components of a seismic exploration system.
Figure 2A:
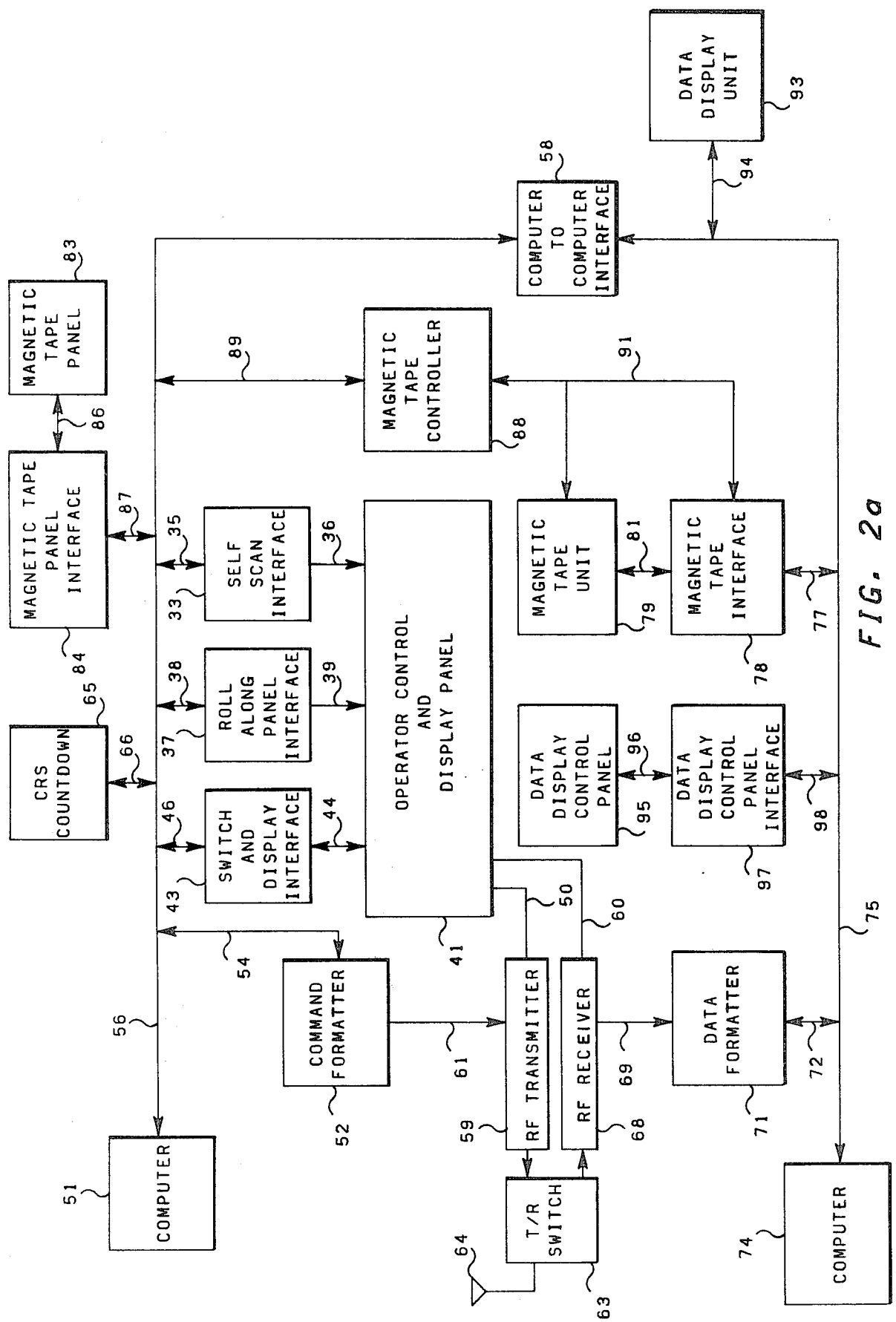
FIG. 2a is a block diagram of a central recording station.
Figure 2B:
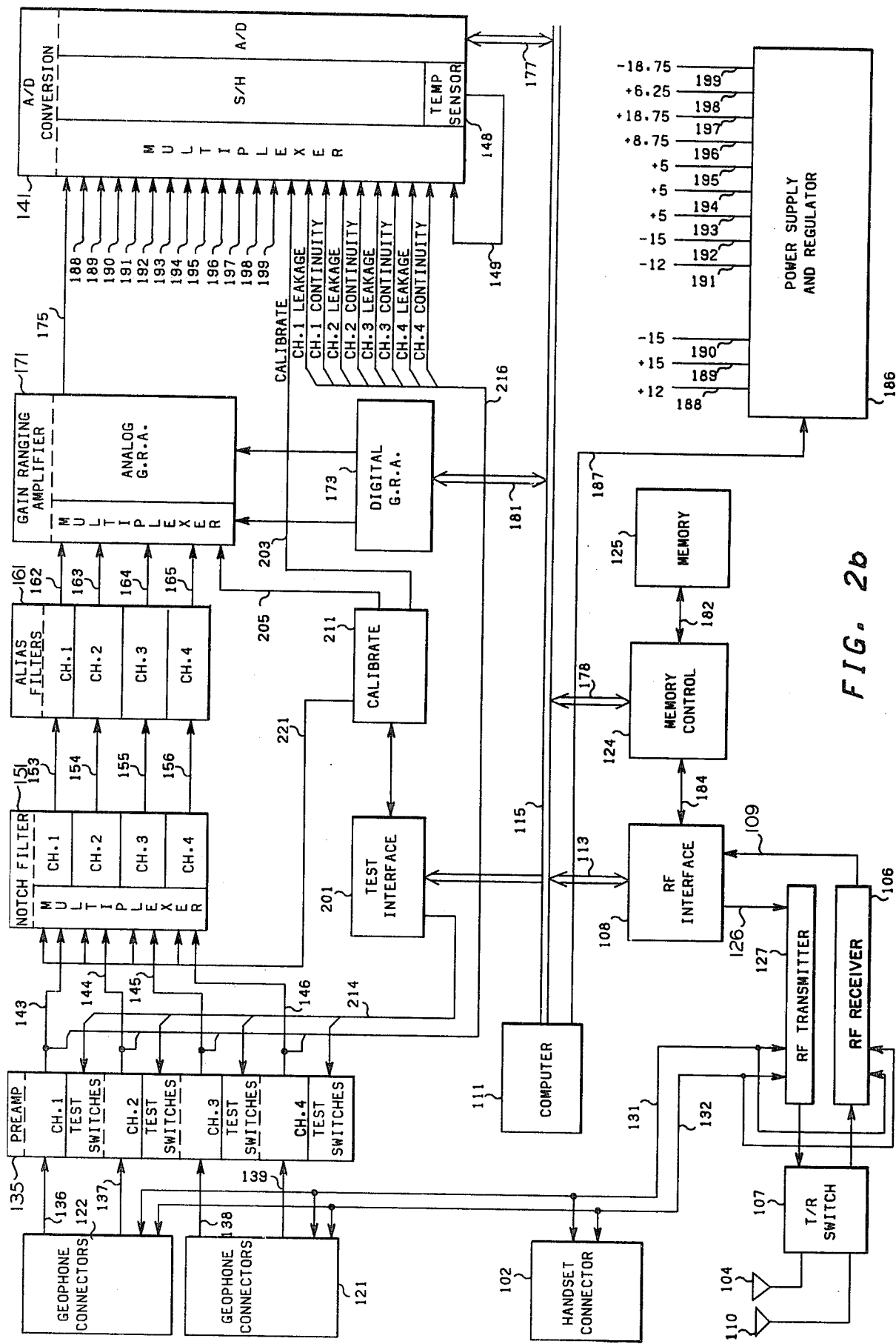
FIG. 2b is a block diagram of a remote telemetry unit.
Figure 3:
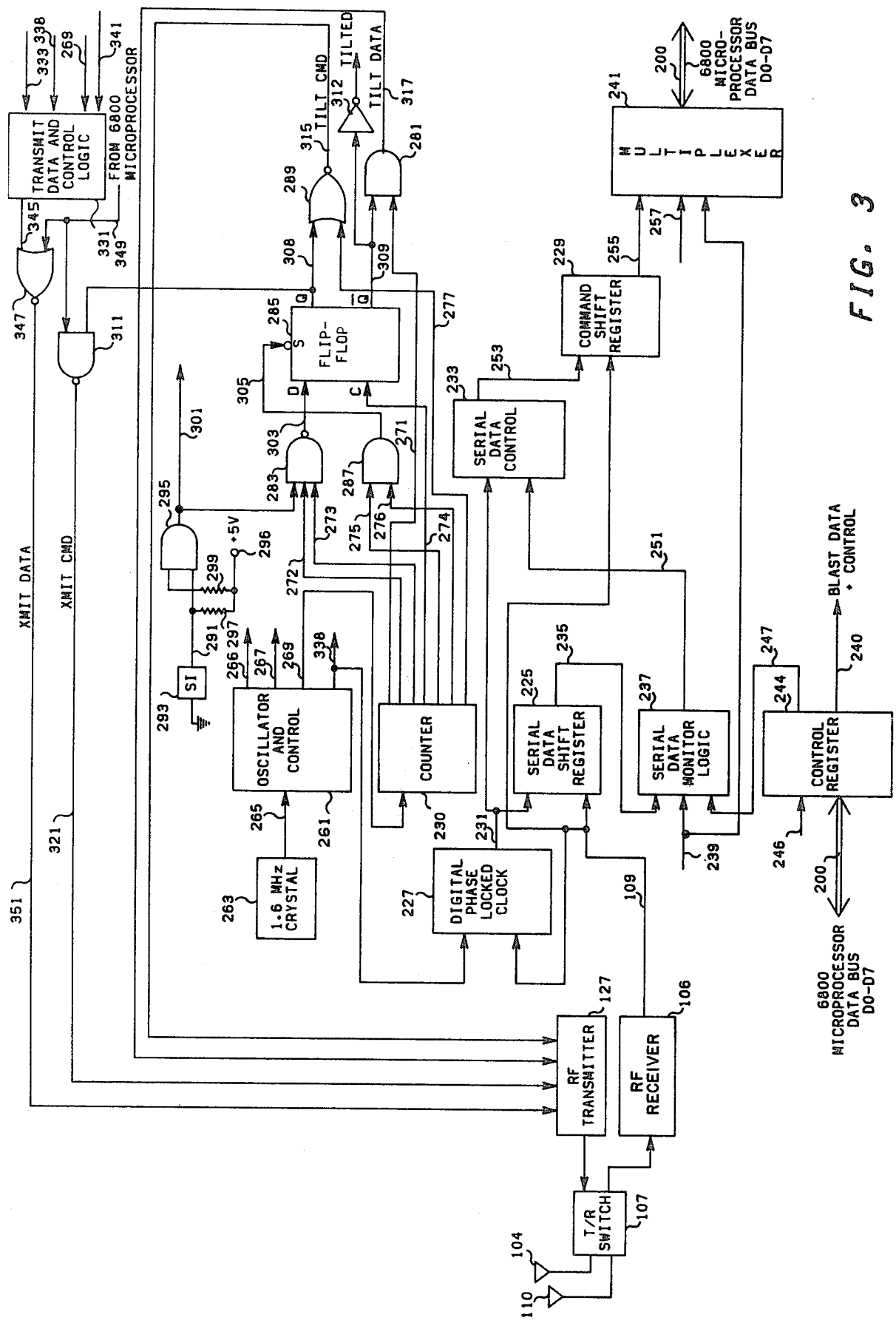
FIG. 3 is a schematic diagram of the RF interface illustrated in FIG. 2b.
Figure 4:
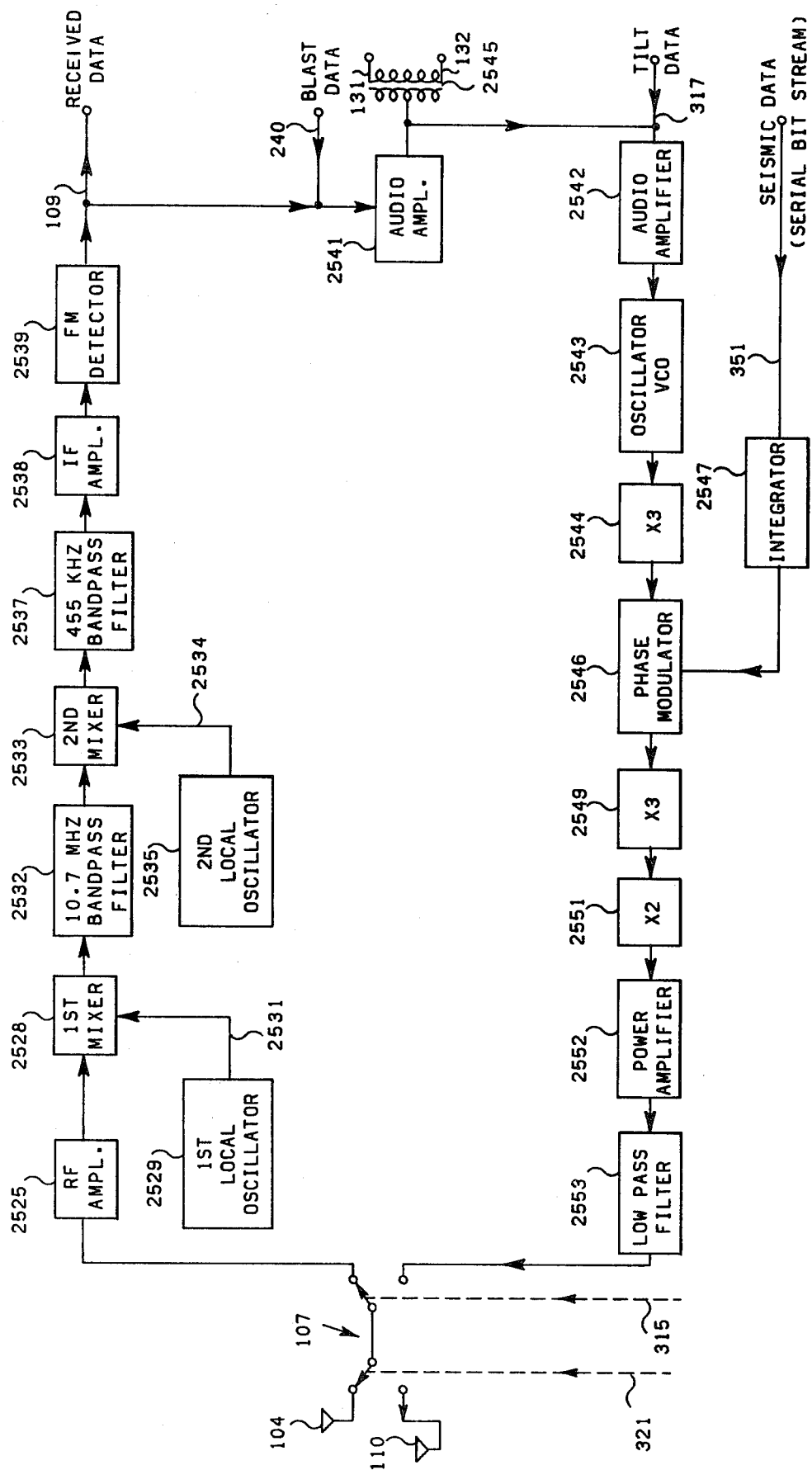
FIG. 4 is a schematic diagram of the RF receiver and the RF transmitter illustrated in FIG. 2b and in FIG. 3.

4,257,098, are hereby incorporated by reference. The brief description of FIGS. 3–20 and 23–73, the detailed description of the drawings and the Appendix of application Ser. No. 955,905, now U.S. Pat. No. 4,257,098, are also hereby incorporated by reference.

That which is claimed is:

1. A seismic system for geophysical exploration comprising:
   at least one remote geophone monitoring means, each said remote geophone monitoring means being adapted to receive electrical signals from at least one geophone means; and
   a central control means for generating electrical signals for initiating the operation of said at least one remote geophone monitoring means;
   said central control means including means for receiving data from said at least one remote geophone monitoring means;
   each said remote geophone monitoring means including:
      means for generating a tilt alarm signal representative of an indication that said remote geophone monitoring means has been tilted with respect to a desired position of said remote geophone monitoring means;
      means for sensing that said remote geophone monitoring means has been tilted with respect to a desired position of said remote geophone monitoring means and for generating an enabling signal when said remote geophone monitoring means has been tilted;
      means for supplying said enabling signal to said means for generating a tilt alarm signal to thereby enable said means for generating a tilt alarm signal to generate a tilt alarm signal;
      means for transmitting a signal to said central control means;
      means for supplying said tilt alarm signal to said means for transmitting a signal to said central control means, said tilt alarm signal being automatically supplied from said remote geophone monitoring means to said central control means.

2. Apparatus in accordance with claim 1 wherein said means for sensing that said remote geophone monitoring means has been tilted and for generating said enabling signal comprises:
   a switching means having first and second terminals;
   means for grounding the first terminal of said first switching means;
   an AND gate means having at least first and second input terminals and an output terminal;
   means for electrically connecting the second terminal of said switching means to said first terminal of said AND gate means;
   means for establishing a first signal having a positive voltage level;
   means for supplying said first signal to said first terminal and said second terminal of said AND gate means, the output of said AND gate means going to a high binary state to provide said enabling signal when said switching means opens to indicate that said remote geophone monitoring means has been tilted.

3. Apparatus in accordance with claim 2 wherein said means for generating said tilt alarm signal comprises:
   a NAND gate means having at least first and second input terminals and an output terminal;
   means for supplying said enabling signal to said first input terminal of said NAND gate means;
   a counter means having a plurality of outputs;
   means for electrically connecting at least one of said plurality of outputs from said counter means to said second input terminal of said NAND gate means;
   a flip-flop means having a set input, a data input, a clock input and a data output;
   means for electrically connecting the output of said NAND gate means to the data input of said flip-flop means;
   means for electrically connecting at least one of said plurality of outputs from said counter means to the set input of said flip-flop means; and means for electrically connecting at least one of said plurality of outputs from said counter means to the clock input of said flip-flop means, said tilt alarm signal being supplied from the data output of said flip-flop means when said enabling signal is in a high binary state.

4. Apparatus in accordance with claim 1 wherein said plurality of remote geophone monitoring means additionally include means for generating an audio alarm when said remote geophone monitoring means has been tilted with respect to a desired position of said remote geophone monitoring means.

5. A method for indicating that a remote geophone monitoring means has been tilted with respect to a desired position of said remote geophone monitoring means comprising the steps of:
   sensing that said remote geophone monitoring means has been tilted with respect to a desired position of said remote geophone monitoring means and generating an enabling signal when said remote geophone monitoring means is tilted;
   generating a tilt alarm signal in response to said enabling signal; and
   automatically transmitting said tilt alarm signal from said remote geophone monitoring means to a central control station to thereby provide an indication that said remote geophone monitoring means has been tilted.

6. A method in accordance with claim 5 wherein said step of sensing that said remote geophone monitoring means has been tilted and generating said enabling signal comprises:
   maintaining a switching means in a closed position when said remote geophone monitoring means is not tilted to thereby inhibit the generation of said enabling signal; and
   opening said switching means when said remote geophone monitoring means has been tilted with respect to a desired position of said remote geophone monitoring means to thereby generate said enabling signal.

7. A method in accordance with claim 6 wherein said step of generating a tilt alarm signal comprises:
   generating a plurality of periodically pulsating electrical signals; and
   generating said tilt alarm signal in response to said plurality of periodically pulsating electrical signals and said enabling signal.

8. A method in accordance with claim 5 additionally comprising the step of generating an audio alarm at the location of said remote geophone monitoring means when said remote geophone monitoring means is tilted with respect to a desired position of said remote geophone monitoring means.

* * * * *